US012580438B2

(12) United States Patent    (10) Patent No.:   US 12,580,438 B2

Ragot et al.      (45) Date of Patent:    Mar. 17, 2026

---

(54) ROTOR HAVING A HOLDING DEVICE FOR A COIL DEVICE, ELECTRIC MACHINE COMPRISING A ROTOR, AND MOTOR VEHICLE COMPRISING AN ELECTRIC MACHINE

(71) Applicant: Bayerische Motoren Werke Aktiengesellschaft, Munich (DE)

(72) Inventors: Jerome Ragot, Munich (DE); Robert Schmidt, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 197 days.

(21) Appl. No.: 18/565,145

(22) PCT Filed: Jul. 25, 2022

(86) PCT No.: PCT/EP2022/070796
§ 371 (c)(1),
(2) Date: Nov. 29, 2023

(87) PCT Pub. No.: WO2023/020786
PCT Pub. Date: Feb. 23, 2023

(65) Prior Publication Data
US 2024/0322633 A1     Sep. 26, 2024

(30) Foreign Application Priority Data

Aug. 20, 2021   (DE) ..................... 10 2021 121 626.5

(51) Int. Cl.
*H02K 3/487*      (2006.01)
*H02K 1/26*       (2006.01)

(52) U.S. Cl.
CPC ............... *H02K 3/487* (2013.01); *H02K 1/26* (2013.01)

(58) Field of Classification Search
CPC ........... H02K 3/487; H02K 3/493; H02K 1/26
(Continued)

(56) References Cited

U.S. PATENT DOCUMENTS 6,124,659 A * 9/2000 Rowe ..................... H02K 3/487
                                    310/214
2005/0231058 A1* 10/2005 Down ..................... H02K 3/527
                                    310/192

(Continued)

FOREIGN PATENT DOCUMENTS

DE     10 2016 203 311 A1     9/2016
DE     11 2018 003 735 T5     4/2020

(Continued)

OTHER PUBLICATIONS

Machine translation of JP-2016059099-A. (Year: 2016).*

(Continued)

*Primary Examiner* — Michael Andrews
(74) *Attorney, Agent, or Firm* — Crowell & Moring LLP

(57)         ABSTRACT

A rotor for an electric machine includes at least one rotor laminated core that has at least one coil receiving opening, at least one coil device which is located in the at least one coil receiving opening, and at least one holding device which is joined to the rotor laminated core and prevents an outward movement, brought about by centrifugal force, of the at least one coil device in the radial extension direction of the rotor and out of the at least one coil receiving opening during normal use of the electric machine. The at least one holding device includes a first holding element which is joined to the rotor laminated core and at least partially closes the at least one coil receiving opening outwardly in the radial extension direction and thus prevents the movement and at least one second holding element which is joined to the rotor laminated core and is located between the first holding element and a rotational axis of the rotor in the radial (Continued)

extension direction and supports at least one coil device part of the at least one coil device against the movement brought about by centrifugal force.

6 Claims, 1 Drawing Sheet

(58) Field of Classification Search
USPC ........................................................ 310/214
See application file for complete search history.

(56) References Cited

U.S. PATENT DOCUMENTS

| | | | |
|---|---|---|---|
| 2014/0252910 A1 | 9/2014 | Kunihiro et al. | |
| 2017/0310186 A1* | 10/2017 | Wang ........................ | H02K 1/16 |
| 2020/0161939 A1* | 5/2020 | Takahashi .............. | H02K 17/16 |

FOREIGN PATENT DOCUMENTS

| | | | |
|---|---|---|---|
| DE | 10 2020 129 142 A1 | | 5/2022 |
| EP | 2 845 295 B1 | | 12/2019 |
| FR | 376 255 A | | 8/1907 |
| JP | 49-4642 Y1 | | 2/1974 |
| JP | 57-135857 U | | 8/1982 |
| JP | 62-33653 U | | 2/1987 |
| JP | 2015-33225 A | | 2/2015 |
| JP | 2016-59099 A | | 4/2016 |
| JP | 2016059099 A | * | 4/2016 |

OTHER PUBLICATIONS

International Search Report (PCT/ISA/210) issued in PCT Application No. PCT/EP2022/070796 dated Nov. 24, 2022 with English translation (4 pages).
German-language Written Opinion (PCT/ISA/237) issued in PCT Application No. PCT/EP2022/070796 dated Nov. 24, 2022 with English translation (10 pages).
German Search Report issued in German Application No. 10 2021 121 626.5 dated May 5, 2022 with partial English translation (12 pages).

* cited by examiner

ROTOR HAVING A HOLDING DEVICE FOR A COIL DEVICE, ELECTRIC MACHINE COMPRISING A ROTOR, AND MOTOR VEHICLE COMPRISING AN ELECTRIC MACHINE

BACKGROUND AND SUMMARY

The invention relates to a rotor for an electric machine. Further aspects of the invention relate to an electric machine comprising such a rotor, and to a motor vehicle comprising an electric machine.

In order to improve the maximum output and the continuous performance of electric motors, various known approaches can be found in the prior art. For example, the continuous output of what are referred to as PSM machines can be increased by the rotors thereof being cooled by means of a fluid, in particular a coolant. In this case, the fluid usually flows through a rotor shaft of the respective rotor, with heat created during the operation of the PSM machine being discharged from the rotor by means of the fluid along a heat path from respective magnets of the rotor and via respective laminated cores of the rotor and via the rotor shaft.

Depending on the configuration of the electric motor, another approach resides in using what are referred to as rare earth magnets, which have a high energy density, as permanent magnets. However, there is, for example, a heavy environmental impact associated with the extraction of rare earth products.

In order to meet increasing requirements regarding the maximum output, the "durability" of electric machines and especially the rotors thereof also has to be increased. This includes, for example, measures which increase the fail safety of rotors at high rotor rotational speeds.

It is the object of the present invention to provide a rotor, an electric machine and a motor vehicle which can be operated in a particularly fail-safe manner at high rotor rotational speeds.

This object is achieved by a rotor, an electric machine, and a motor vehicle having the features of the independent claims. Advantageous refinements with expedient developments of the invention are specified in the dependent claims.

A first aspect of the invention relates to a rotor for an electric machine, having at least one rotor laminated core, which has at least one coil receiving opening, having at least one coil device, which is arranged in the at least one coil receiving opening, and having at least one holding device, which is joined to the rotor laminated core and, during use of the electric machine as intended, prevents a centrifugal-force-induced movement of the at least one coil device outward in the direction of radial extent of the rotor and out of the at least one coil receiving opening.

According to the invention, it is provided that the at least one holding device comprises a first holding element which is joined to the rotor laminated core, closes the at least one coil receiving opening outward at least in certain regions in the direction of radial extent and thereby prevents the movement, and comprises at least one second holding element which is joined to the rotor laminated core, is arranged in the direction of radial extent between the first holding element and a rotational axis of the rotor and supports at least one coil device part of the at least one coil device against the centrifugal-force-induced movement. The rotor can be designed in particular as a multi-pole solid pole rotor, i.e., can have a number of pole pairs of greater than or equal to two. The first holding element can outwardly close, or close in certain regions, i.e., at least constrict, the coil receiving opening preferably completely in the direction of radial extent. A substantial advantage of the invention consists in that, by means of the holding device, respective retaining forces preventing the movement can act at different points of the coil device and can be supported on the rotor laminated core. While the first holding element can be used, for example, firstly to outwardly close the coil receiving opening in the direction of radial extent and counteracts the centrifugal-force-induced movement by the coil device being supported on the first holding element, the second holding element, which lies further inward in the direction of radial extent, is used for supporting the coil device part, i.e., a part of the coil device.

The invention is based on the finding that coils of rotors which are configured in particular as multi-pole solid pole rotors (number of pairs of polls>=2) are introduced from the outside into the rotor laminated core in the direction of radial extent and, in the process, into the coil receiving opening, with the coil receiving opening subsequently being closed with a slot closing wedge in order to ensure safe operation of the electric machine. Since, for example, in the case of multi-pole solid pole rotors, a joining direction of the coils does not point in the same direction as the centrifugal force, the rotor laminated core is pulled apart under rotational speed loading and thereby fans out. Despite the gap created between the windings and a wall of the rotor laminated core bounding the coil receiving opening, the slot closing wedge effectively holds back the windings, with sufficient heat dissipation from the coils (current-carrying components) during operation being ensured and an air gap between the rotor and stator not being impermissibly reduced.

The invention starts here since the holding elements secure the coil device at points spaced apart from one another in the direction of radial extent against the movement such that the coil device is supported not only at the outermost end of the coil receiving opening in the direction of radial extent, but also further inward in the direction of radial extent, for example, between the outermost end and the rotational axis. This can bring about an improved distribution of centrifugal-force-induced holding forces to the rotor laminated core via the holding elements.

In an advantageous development of the invention, the at least one coil device comprises at least two coils, of which a first coil is supported in relation to the centrifugal-force-induced movement by means of the first holding element and a second coil is supported in relation thereto by means of the second holding element. This is advantageous since a particularly durable fixing of the coils arranged in the coil receiving opening can thereby take place. The coil device has at least the two coils which are separated from one another and are each supported on the rotor laminated core by one of the holding elements. As a result, respective materials of the holding elements can also be selected flexibly, as can a respective geometrical design and in particular size of the holding elements.

In a further advantageous development of the invention, the second holding element holds the at least two coils at a distance from one another or the second holding element is in engagement, in particular in form-fitting engagement, with a coil connection region of the at least one coil device, the coil connection region connecting the at least two coils to one another. If the second holding element holds the at least two coils at a distance from one another, a respective load distribution of centrifugal-force-induced forces to the individual holding elements can be undertaken in a particularly targeted way such that in each case one of the holding elements holds in each case one of the coils and prevents the movement. For the alternative situation, according to which the second holding element is in engagement with a coil connection region of the at least one coil device, the coil connection region connecting the at least two coils to one another, the coils which are coupled to one another via the coil connection region can advantageously be introduced simultaneously into the coil receiving opening, and the two holding elements together prevent the movement of the entire coil device. It is conceivable, for example, for the second holding element to be able to have a U-shaped cross section and, when arranged on the rotor laminated core, to engage in certain regions around the coil device by way of the coil connection region.

In a further advantageous development of the invention, the first holding element and/or the second holding element are/is connected to the rotor laminated core in a form-fitting manner. This is advantageous since, by this means, a particularly durable connection which is reversibly releasable, i.e., without being destroyed, can be created between the first holding element and/or the second holding element and the rotor laminated core.

In a further advantageous development of the invention, the at least one coil receiving opening is configured as a slot, and the first holding element and/or the second holding element are/is in the form of a wedge, in particular a slot closing wedge. This is of advantage since the slot and the slot closing wedge can be produced with little outlay.

In a further advantageous development of the invention, the first holding element is in contact against a larger contact surface of the rotor laminated core than the second holding element. As a result, a particularly component-protecting distribution of centrifugal-force-induced pressures or stresses to the rotor laminated core can be achieved in an advantageous way.

In a further advantageous development of the invention, the holding elements are formed from different materials from one another. This advantageously permits a particularly flexible configuration of the rotor and distribution of rotating masses such that a small mass moment of inertia of the rotor along with sufficient durability can be realized.

In a further advantageous development of the invention, the first holding element is formed from a metallic material and the second holding element from a plastic. This advantageously permits a particularly load-oriented configuration and selection of material of the respective holding elements. The metallic material can be in particular steel, for example, stainless steel.

A second aspect of the invention relates to an electric machine comprising a rotor according to the first aspect of the invention. Such an electric machine can be operated in a particularly fail-safe manner.

A third aspect of the invention relates to a motor vehicle comprising an electric machine according to the second aspect of the invention, wherein the electric machine is in the form of a traction machine of the motor vehicle. Such a motor vehicle can be operated in a particularly fail-safe manner.

The preferred embodiments proposed with reference to one of the aspects, and the advantages thereof apply correspondingly to the respective other aspects of the invention, and vice versa.

The features and combinations of features mentioned above in the description, and the features and combinations of features mentioned below in the description of the figures and/or shown individually in the figures can be used not only in the respectively stated combination, but also in other combinations or individually, without departing from the scope of the invention.

Further advantages, features and details of the invention are apparent from the claims, the description below of preferred embodiments and with reference to the drawings.

The invention is explained once again below with reference to a specific exemplary embodiment. For this purpose:

DETAILED DESCRIPTION OF THE DRAWINGS

Figure 1:
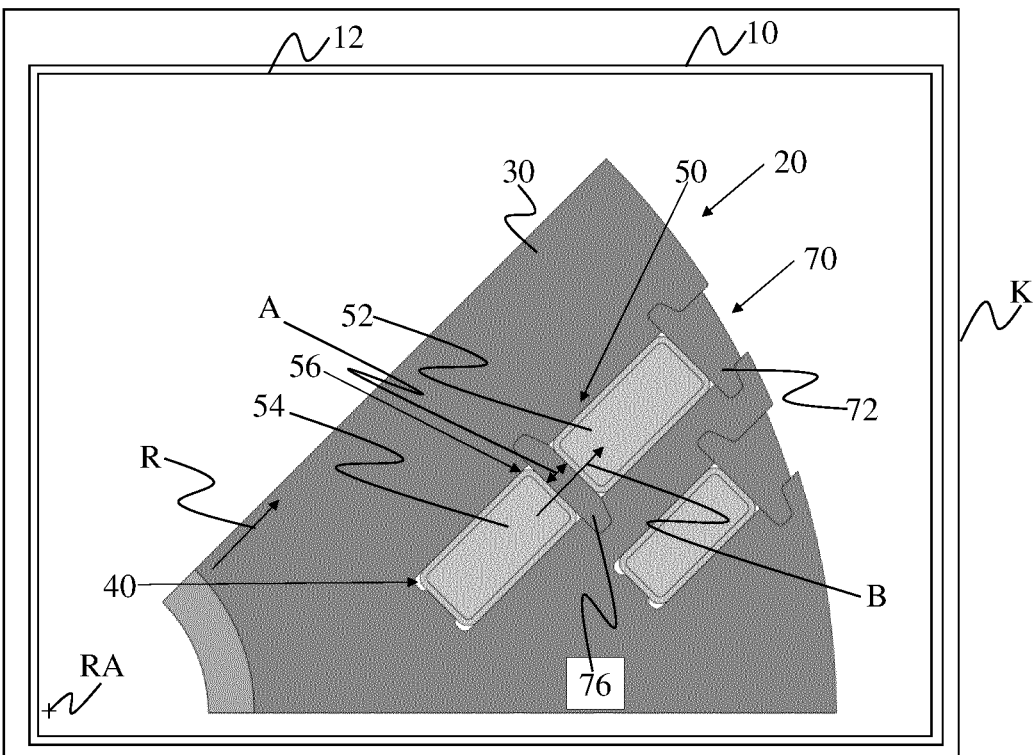
FIG. 1 shows a schematic sectional illustration of a partial region of a rotor of an electric machine, which has a rotor laminated core with a coil receiving opening, in which a coil device with two coils is arranged, which coils are supported in relation to a centrifugal-force-induced movement in the direction of radial extent by respective holding elements of a holding device of the rotor, wherein the second holding element of the holding elements holds the two coils at a distance from each other.
Figure 2:
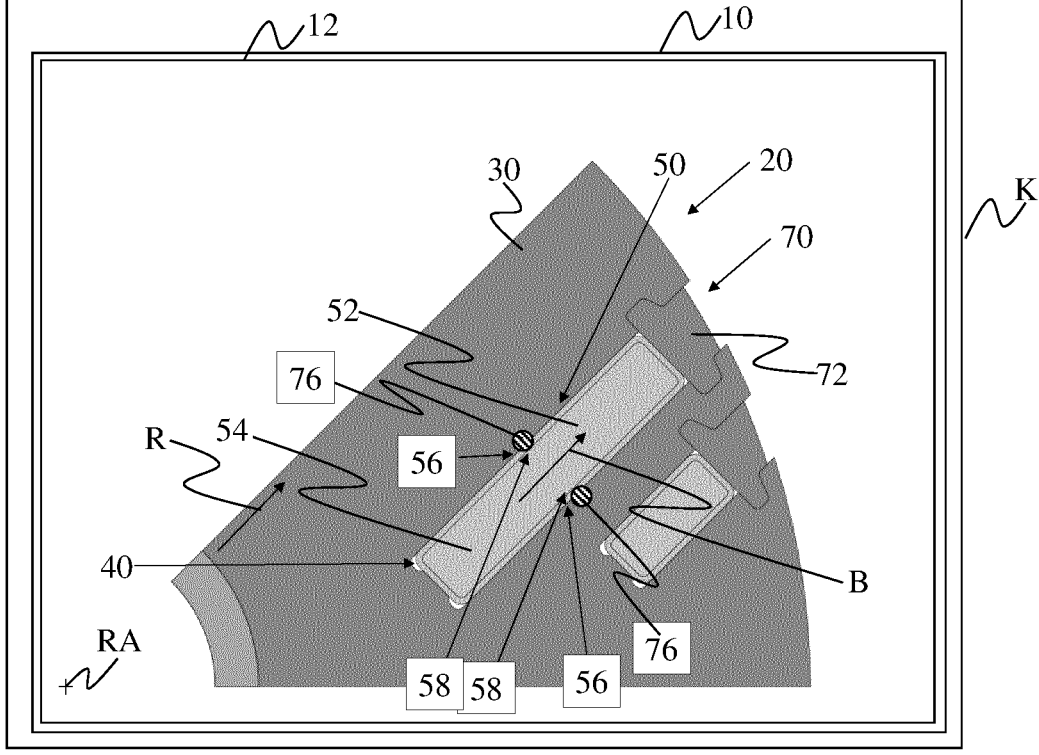
FIG. 2 shows a schematic sectional illustration of a partial region of a variant of the rotor, in which the second holding element is in engagement with a coil connection region of the at least one coil device, the coil connection region connecting the at least two coils to one another.

FIG. 1 and FIG. 2 both show schematic sectional illustrations of a partial region of a rotor 20 according to a sectional plane running perpendicularly to a rotational axis RA of the rotor 20. The rotor 20 is assigned to an electric machine 10 which is illustrated merely schematically and in highly abstract form and which is configured as a traction machine of a motor vehicle K, likewise illustrated schematically and in highly abstract form. A stator 12 of the electric machine 10 is likewise illustrated in highly abstract form, with the rotor 20 being mounted rotatably relative to the stator 12.

The rotor 20 comprises a rotor laminated core 30 which has a plurality of coil receiving openings 40 in the form of respective slots. The coil receiving openings 40 are distributed regularly in the circumferential direction of the rotor 20, which cannot be seen because of the partial illustration in FIG. 1 and FIG. 2. The rotor 20 likewise comprises a plurality of coil devices 50, of which in each case one is arranged in one of the coil receiving openings 40.

Furthermore, the rotor 20 comprises a plurality of holding devices 70 which are joined to the rotor laminated core 30 and, during use of the electric machine 10 as intended, prevent a respective centrifugal-force-induced movement B, clarified by an arrow, of the coil devices 50 outward in the direction of radial extent R of the rotor 20 and out of the respective coil receiving openings 40. Use as intended should be understood as meaning a use of the electric machine 10, in which a rotation of the rotor 20 relative to the stator 12 occurs in order to generate driving power driving the motor vehicle K (motor mode) or for recovering energy (recuperation; generator mode).

Each of the holding devices 70 comprises a first holding element 72 which is joined to the rotor laminated core 30, outwardly closes the respective coil receiving opening 40 in the direction of radial extent R and thereby prevents the movement B. Furthermore, each of the holding devices 70 comprises a second holding element 76 which is joined to the rotor laminated core 30, is arranged in the direction of radial extent R between the first holding element 72 and the rotational axis RA of the rotor 10 and supports a respective coil device part 56 of the respective coil device 50 against the centrifugal-force-induced movement B.

The first holding element 72 and the second holding element 76 are each connected in a form-fitting manner to the rotor laminated core 30 and can each be designed as a wedge, in particular slot closing wedge.

Each of the coil devices 50 comprises two coils 52, 54, of which a first coil 52 is supported in relation to the centrifugal-force-induced movement B by means of the respective first holding element 72 and a second coil 54 is supported in relation thereto by means of the respective second holding element 76.

In the variant shown in FIG. 1, the second holding element 76 holds the two coils 52, 54 at a distance A from one another.

In the variant shown in FIG. 2, the second holding element 76 is in engagement with a coil connection region 58 of the respective coil device 50, the coil connection region connecting the two coils 52, 54 to each other. In the variant shown in FIG. 2, the second holding element 76 has, by way of example, a U-shaped cross section and can thereby engage in certain regions around the coil connection region 58, at which the coil device 50 is tapered and the coils 52, 54 are connected to each other.

The respective first holding elements 72 are in contact against a larger contact surface of the rotor laminated core 30 than the respective second holding elements 76.

The holding elements 72, 76 are formed from materials which are different from one another, wherein the first holding elements 72 are formed from a metallic material and the second holding elements 76 are formed from a plastic.

The concept illustrated here is based on the principle of the combination of geometrical optimum configuration of the holding elements 72, 76 (slot closing wedges) and the optimum selection of the material thereof.

To reduce the centrifugal forces, it is expedient to insert a plurality of individual coils 52, 54, instead of one large coil, into the coil receiving opening 40 (slot). The centrifugal forces can be divided by the separation of the coils 52, 54 between the respective holding elements 72, 76 and therefore the individual loading of the respective holding element 72, 76 can be significantly reduced, as a result of which the holding elements 72, 76 (slot closing wedges) can be designed to be overall smaller. The selection of different materials for the slot closing wedges 72, 76 forms a further step for the stability of the rotor 20. The radially outer slot closing wedges (first holding element 72), which are closest to the pole core, can preferably be formed from a metallic material, e.g., stainless steel, in order to keep the radial deformations of the coils 52, 54 during operation the smallest possible (approximately-25%). The slot closing wedges lying further inward (second holding element 76) can be formed from plastic since the mechanical loadings here are significantly lower.

LIST OF REFERENCE SIGNS

10 electric machine
12 stator
20 rotor
30 rotor laminated core
40 coil receiving opening
50 coil device
52 first coil
54 second coil
56 coil device part
58 coil connection region
70 holding device
72 first holding element
76 second holding element
A distance
B movement
K motor vehicle
R direction of radial extent
RA rotational axis

What is claimed is:

1. A rotor for an electric machine, the rotor comprising:
at least one rotor laminated core, which has at least one coil receiving opening;
at least one coil device, which is arranged in the at least one coil receiving opening; and
at least one holding device, which is joined to the rotor laminated core and configured to prevent a centrifugal-force-induced movement of the at least one coil device outward in a radial direction of the rotor and out of the at least one coil receiving opening;
wherein the at least one holding device includes a first holding element which is joined to the rotor laminated core, closes the at least one coil receiving opening outward at least in certain regions in the radial direction and thereby prevents the centrifugal-force-induced movement, and includes at least one second holding element which is joined to the rotor laminated core, is arranged in the radial direction between the first holding element and a rotational axis of the rotor and supports at least one coil device part of the at least one coil device against the centrifugal-force-induced movement;
wherein the at least one coil device includes at least two coils, of which a first coil is supported in relation to the centrifugal-force-induced movement by the first holding element and a second coil is supported in relation thereto by the second holding element; and
wherein the second holding element is in engagement with a coil connection region of the at least one coil device, the coil connection region connecting the at least two coils to one another.

2. The rotor according to claim 1, wherein at least one of the first holding element and the second holding element is connected to the rotor laminated core in a form-fitting manner.

3. The rotor according to claim 1, wherein the at least one coil receiving opening is configured as a slot, and at least one of the first holding element and the second holding element is configured as a slot closing wedge.

4. The rotor according to claim 1, wherein the first holding element is in contact against a larger contact surface of the rotor laminated core than the second holding element.

5. The rotor according to claim 1, wherein the holding elements are formed from different materials from one another.

6. The rotor according to claim 5, wherein the first holding element includes a metallic material and the second holding element includes a plastic.

* * * * *